United States Patent [19]
Kruyt

[11] Patent Number: 4,626,015
[45] Date of Patent: Dec. 2, 1986

[54] FIREWOOD CARRIER

[76] Inventor: Robert A. Kruyt, P.O. Box 673, Hudson, Que., Canada, J0P 1H0

[21] Appl. No.: 787,441

[22] Filed: Oct. 15, 1985

[51] Int. Cl.⁴ .............................................. B65D 71/00
[52] U.S. Cl. .................................... 294/152; 294/164; 294/169
[58] Field of Search ............... 294/137, 141, 142, 144, 294/148–157, 164, 167–169, 172

[56] References Cited

U.S. PATENT DOCUMENTS

| 149,287 | 4/1874 | Brisback et al. | 294/155 |
| 340,303 | 4/1886 | Fransson | 294/152 |
| 1,010,037 | 11/1911 | Frisz | 294/168 X |
| 1,381,476 | 6/1921 | Lane | 294/169 |
| 1,559,046 | 10/1925 | McLeran | 294/152 |
| 1,722,664 | 7/1929 | Frenning | 294/144 |
| 2,272,314 | 2/1942 | Williams | 294/152 |
| 3,346,157 | 10/1967 | Haney | 294/142 |
| 4,324,428 | 4/1982 | Fieni | 294/169 |

FOREIGN PATENT DOCUMENTS

| 24189 | 2/1908 | Sweden | 294/137 |
| 78080 | 8/1933 | Sweden | 294/169 |

Primary Examiner—Johnny D. Cherry

[57] ABSTRACT

A firewood carrier having a bottom with opposed sides and a pair of handles extending up from the sides and over the bottom. The bottom has a flexible panel so its sides can move toward each other. The handles are resilient. When carrying a load of wood piled in a narrow, high pile on the panel, the panel sags, drawing the handles tight against the pile of wood so as to securely hold it while transporting it.

1 Claim, 5 Drawing Figures

U.S. Patent    Dec. 2, 1986    4,626,015
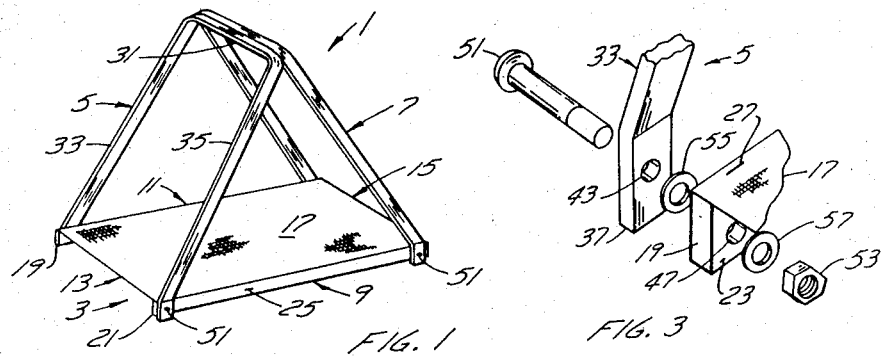
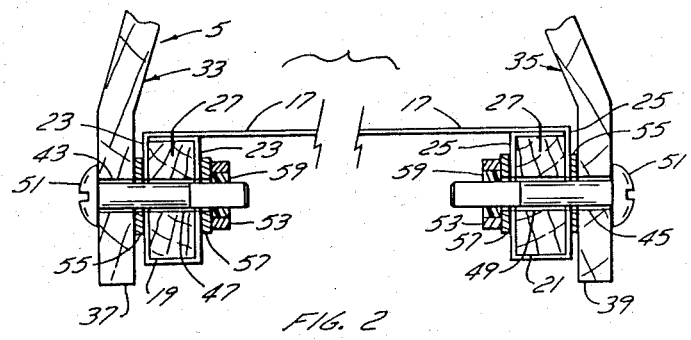
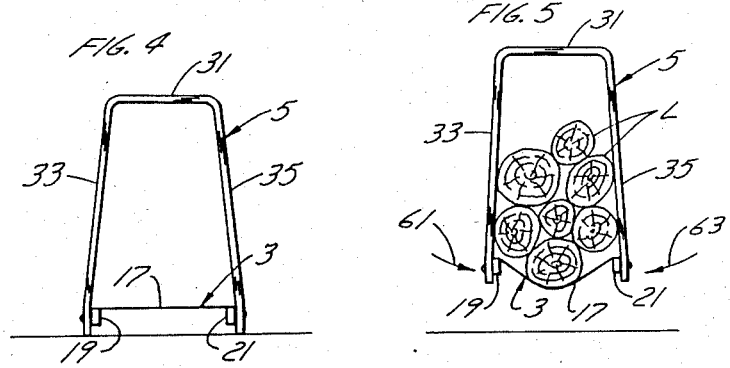

FIREWOOD CARRIER

BACKGROUND OF THE INVENTION

1. Field of the Invention

This invention is directed toward a hand carrier for a plurality of horizontally-disposed, piled, articles.

The invention is more particularly directed toward a hand carrier for a load of firewood.

2. Description of the Prior Art

Firewood hand carriers are well known. One common type employs a rigid base with a rigid, curved handle extending up from the sides of the base. The wood is piled on the base extending under the handle. To provide stability for the wood piled on it, the base is made quite wide and thus is awkward to carry. In addition, the carrier takes up quite a bit of room in use. Another common type of carrier comprises a flexible panel with a handle at each end. The panel is laid out flat and a load of wood is piled on the center of it. The loaded panel is then lifted as a sling and carried by its handles. When laid down however, the carrier opens up, and the wood spreads out, thus again taking up a lot of space. In addition, it is often difficult to draw both handles together when preparing to lift and carry the load of wood.

SUMMARY OF THE INVENTION

It is the purpose of the present invention to provide a hand carrier for firewood that does not take up a lot of space, loaded or unloaded; and that securely holds the load of wood. It is another purpose of the present invention to provide a hand carrier for firewood that is strong and sturdy, yet relatively simple in construction, and inexpensive to manufacture.

In accordance with the present invention, a hand carrier is provided having a bottom with opposed sides, and at least one handle extending up from the sides and over the bottom between the sides. Both the handle and the bottom are constructed to allow the sides of the bottom to move toward each other. The carrier is loaded with a pile of wood while sitting on the ground with the sides of the bottom in a maximum, or close to a maximum, spread-apart position. The wood is piled on the carrier bottom under the handle in a relatively tall, narrow pile. Such a pile of wood is normally unstable. When the loaded carrier is lifted to transport the pile of wood, the unique handle and bottom construction allows the sides of the bottom of the carrier to move together due to the weight of the wood. The movement of the sides causes the handle, attached to the sides, to tightly grip the relatively tall, unstable, load of wood by its lower portions so that the load is securely carried.

To have the sides of the carrier bottom move toward each other when the load of wood is lifted, both the bottom and the handle are preferably made of flexible material. The bottom can comprise a pair of rigid side members with a flexible bottom panel, such as canvas, extending between them. The handle, or handles, can be made from a curved, resilient strip of material, such as laminated wood. The resilient handle normally holds the side members of the carrier bottom spaced-apart a maximum, or almost a maximum, distance for loading, with the bottom panel generally straight. When the loaded carrier is lifted, the load of wood causes the bottom panel to sag thereby pulling the rigid side members together and also pulling the lower portions of the flexible handle, attached to the side members, together. This action causes the handle to securely grip the load of wood during transport.

The carrier is quite simple in construction, and relatively inexpensive to manufacture, requiring only a flexible bottom panel, a pair of rigid side members, and at least one flexible, curved handle. Two handles are preferably used however to stabilize the load. The handles are simply attached to the side members.

The invention is particularly directed toward a hand carrier for a plurality of articles having an article supporting bottom with opposed sides, and at least one handle extending up from the sides and over the bottom. The bottom and the handle are constructed to allow the sides of the bottom to move toward each other when the carrier is lifted with a plurality of articles so as to have the handle tightly grip the articles.

BRIEF DESCRIPTION OF THE DRAWINGS

The invention will now be described in detail having reference to the accompanying drawings in which:

FIG. 1 is a perspective view of the log carrier;

FIG. 2 is a detail cross-section view of the carrier;

FIG. 3 is an exploded detail view;

FIG. 4 is an end view of the carrier unloaded; and

FIG. 5 is an end view of the carrier in use.

DESCRIPTION OF THE PREFERRED EMBODIMENTs

The log carrier 1 of the present invention, as shown in FIG. 1, has a log supporting bottom 3 and at least one, and preferably two handles 5, 7 attached to the bottom 3. The bottom 3 has a generally rectangular shape with parallel sides 9, 11 and transverse ends 13, 15. The bottom 3 is constructed so that the sides 9, 11 can move toward each other. To this end, the bottom 3 can comprise a flexible panel 17, such as a cloth or canvas panel fastened to, and extending between two parallel side supports 19, 21. Each side support 19, 21 comprises a straight, rigid, member such as a piece of hardwood. One side 23 of the bottom panel 17 is wrapped about side support 19 and adhesively fixed to it as shown in FIG. 2. The other side 25 of the bottom panel 17 is wrapped about the other side support 21 and adhesively fixed to it. Staples 27 can be used with the adhesive to securely fasten the sides 23, 25 of the panel to the side supports 19, 21. With this construction, the sides 9, 11 of the bottom 3 can move toward or away from each other.

The handles 5, 7 are similar in construction and only one will be described in detail. The handle 5 has a top 31 and a pair of legs 33, 35 extending downwardly from the top 31. The handle 5 is constructed so that the legs 33, 35 can move toward or away from each other. To this end, the handle 5 is preferably constructed from a single, bent strip of flexible, shape-restoring material such as laminated wood. As a result, the bottom ends 37, 39 of the legs 33, 35 can move toward or away from each other with the legs 33, 35 pivoting about their connection to the top 31 of the handle 5.

Handle 5 is attached, via the bottom ends 37, 39 of the legs 33, 35, to the bottom 3 near one end 13 and handle 7 is attached in a similar manner to the bottom 3 near its other end 15. Holes 43, 45 are provided in the legs 33, 35 at their bottom ends 37, 39. Holes 47, 49 are also provided in the side supports 19, 21 near the end 13 of the bottom 3. The holes 47, 49 extend through the flexible panel 17 wrapped about the side supports 19, 21. A bolt 51 is passed through hole 43 in handle 5 and hole 47 in side support 19 of bottom 3. A nut 53, fastened to the bolt 51, joins the leg 33 of handle 5 to the side support 19 of bottom 3. Similar bolt and nut fasteners 51, 53 join the other leg 35 of handle 5 to side support 21 of bottom 3, and the legs 33, 35 of the other handle 7 to the side supports 19, 21 of the bottom 3 near its other end 15. A first washer 55, as shown in FIG. 3, can be provided between each leg of each handle, and each side support. A second washer 57 can be provided between each nut 53 and the respective side supports 19, 21. The nut 53 preferably is provided with a locking insert 59 so that the nut 53 will hold the bolt 51 tight but not so tight that the handles cannot move relative to the bottom. Preferably the nut 53 is tightened sufficiently to hold the handles 5, 7 upright. The attached handles 5, 7 are positioned with their tops 31 touching.

When the carrier is unloaded, the handles 5, 7 of the carrier 1 are unstressed and extend slightly outwardly maintaining the side supports 19, 21 of the bottom 3 at or close to their maximum spacing from each other and maintaining the bottom panel 17 relatively straight as shown in FIG. 4. When the carrier is loaded with wood logs "L", and lifted as shown in FIG. 5, the bottom 3 sags slightly from the weight of the logs "L", causing the side supports 19, 21 to move toward each other as shown by arrows 61, 63 and moving the lower ends of the attached legs 33, 35 of each handle 5, 7 toward each other. As the legs 33, 35 move together, they securely grip the logs "L" loaded between them on the bottom 3 of the carrier. Thus the load of logs is easily and securely carried. Because the handles grip the logs while carrying them, the logs can be piled in a relatively high, narrow pile. Thus the carrier, loaded or unloaded, takes up considerably less space than known carriers.

The handles can be moved to lie generally parallel with the side supports so as to make the carrier compact for storage when not in use.

I claim:

1. A firewood carrier comprising: a generally rectangular bottom having two rigid, parallel side supports and a flexible panel fixed to the side supports and extending between them along their length; a pair of U-shaped, resilient handles each having a pair of legs joined by a cross-bar; one of the handles connected at the end of one leg to one end of one of the side supports and at the end of the other leg to one end of the other side support to have the cross-bar overlie the panel; the other handle connected at the end of one leg to the other end of the one side support and at the end of the other leg to the other end of the other side support to have the cross-bar overlie the panel;

the handles, in their normal, relaxed position, holding the side supports spaced-apart to have the panel gently taut whereby when a pile of wood is loaded onto the panel of the carrier between the legs of each handle and the loaded carrier is then lifted via the handles, the panel will sag drawing the side supports, and thus the legs of each handle, toward each other to tightly hold the wood on the carrier between the legs of each handle during transport.

* * * * *